US009423886B1

(12) United States Patent
Neglur et al.

(10) Patent No.: US 9,423,886 B1
(45) Date of Patent: Aug. 23, 2016

(54) SENSOR CONNECTIVITY APPROACHES

(71) Applicant: Amazon Technologies, Inc., Reno, NV (US)

(72) Inventors: Smita Neglur, Santa Clara, CA (US); Aleksandar Pance, Saratoga, CA (US)

(73) Assignee: Amazon Technologies, Inc., Reno, NV (US)

( * ) Notice: Subject to any disclaimer, the term of this patent is extended or adjusted under 35 U.S.C. 154(b) by 172 days.

(21) Appl. No.: 13/769,067

(22) Filed: Feb. 15, 2013

Related U.S. Application Data (60) Provisional application No. 61/708,772, filed on Oct. 2, 2012.

(51) Int. Cl.
*G06F 3/033* (2013.01)

(52) U.S. Cl.
CPC ..................................... *G06F 3/033* (2013.01)

(58) Field of Classification Search
CPC ...... G06F 3/017; G06F 3/0346; G06F 3/033; G06K 9/00335; G06K 9/00013; H04N 13/0242; G06T 7/0075; G06T 2207/10012; G06T 7/0065; G06T 7/0022
USPC ........... 345/158, 175, 418; 348/48; 382/103, 382/115, 154; 715/863
See application file for complete search history.

(56) References Cited

U.S. PATENT DOCUMENTS

| | | |
|---|---|---|
| 5,563,986 A | 10/1996 | Suzuki |
| 5,616,078 A | 4/1997 | Oh |
| 6,272,231 B1 | 8/2001 | Maurer et al. |
| 6,385,331 B2 | 5/2002 | Harakawa et al. |
| 6,434,255 B1 | 8/2002 | Harakawa |
| 6,750,848 B1 | 6/2004 | Pryor |
| 6,863,609 B2 | 3/2005 | Okuda et al. |

(Continued)

FOREIGN PATENT DOCUMENTS

| | | |
|---|---|---|
| CN | 1694045 A | 11/2005 |
| JP | 2002-164990 | 6/2002 |

(Continued)

OTHER PUBLICATIONS

International Written Opinion dated Apr. 7, 2010, for International Application No. PCT/US09/65364 filed Nov. 20, 2009, 7 pages.

(Continued)

*Primary Examiner* — Lun-Yi Lao
*Assistant Examiner* — Elliott Deaderick
(74) *Attorney, Agent, or Firm* — Polsinelli LLP (57) ABSTRACT

A computing device having multiple sensors can operate in different modes, wherein each mode causes data captured by different sensors to be transmitted to a processing component for analysis. In one example, a computing device includes one or more pairs of image sensors. Each pair can be configured such that the transmit lines of the sensors are selectively connected to a host processor or other such component. When in a normal operational mode, the switch can be configured to cause data captured by a first image sensor to be transmitted to a receive input of the host processor. When image data from a second image sensor is to be analyzed, the switch can be adjusted such that the device operates in a bypass mode, such that only data from the second image sensor is received and analyzed by the host processor.

19 Claims, 5 Drawing Sheets

(56) References Cited

U.S. PATENT DOCUMENTS

| | | | |
|---|---|---|---|
| 7,301,526 | B2 | 11/2007 | Marvit et al. |
| 7,379,566 | B2 | 5/2008 | Hildreth |
| 7,401,783 | B2 | 7/2008 | Pryor |
| 7,519,223 | B2 | 4/2009 | Dehlin et al. |
| 2002/0071277 | A1 | 6/2002 | Starner et al. |
| 2005/0104848 | A1* | 5/2005 | Yamaguchi et al. .......... 345/156 |
| 2007/0164989 | A1 | 7/2007 | Rochford et al. |
| 2007/0291334 | A1* | 12/2007 | Nakanishi .......... H04N 5/23245 358/509 |
| 2008/0005418 | A1 | 1/2008 | Julian |
| 2008/0013826 | A1 | 1/2008 | Hillis et al. |
| 2008/0019589 | A1 | 1/2008 | Yoon et al. |
| 2008/0040692 | A1 | 2/2008 | Sunday et al. |
| 2008/0136916 | A1 | 6/2008 | Wolff |
| 2008/0158096 | A1 | 7/2008 | Breed |
| 2008/0174570 | A1 | 7/2008 | Jobs et al. |
| 2008/0266530 | A1 | 10/2008 | Takahashi et al. |
| 2008/0276196 | A1 | 11/2008 | Tang |
| 2008/0303914 | A1* | 12/2008 | Akiyama ................... 348/222.1 |
| 2009/0031240 | A1 | 1/2009 | Hildreth |
| 2009/0079813 | A1 | 3/2009 | Hildreth |
| 2009/0102936 | A1* | 4/2009 | Muramatsu ................ 348/222.1 |
| 2009/0265627 | A1 | 10/2009 | Kim et al. |
| 2009/0278915 | A1* | 11/2009 | Kramer et al. ................. 348/48 |
| 2010/0125816 | A1* | 5/2010 | Bezos .......................... 715/863 |
| 2010/0167783 | A1* | 7/2010 | Alameh et al. ............ 455/556.1 |
| 2010/0231285 | A1* | 9/2010 | Boomer et al. ............... 327/403 |
| 2011/0310005 | A1* | 12/2011 | Chen et al. ................... 345/156 |
| 2013/0258129 | A1* | 10/2013 | Burns ....................... 348/222.1 |

FOREIGN PATENT DOCUMENTS

| | | |
|---|---|---|
| JP | 2002-351603 | 12/2002 |
| JP | 2004-318826 | 11/2004 |
| JP | 2007-121489 | 5/2007 |
| JP | 2008-97220 | 4/2008 |
| WO | 2002015560 A3 | 2/2002 |

OTHER PUBLICATIONS

International Search Report dated Apr. 7, 2012, for International Application No. PCT/US09/65364 filed Nov. 20, 2009, 2 pages.

Canadian Office Action dated May 13, 2013, Canadian Application No. 2,743,914, 2 pages.

Chinese Office Action dated Mar. 22, 2013, Chinese Application No. 200980146841.0, 4 pages.

Korean Non-Final Office Action dated Dec. 21, 2012, Korean Application No. 10-2011-7013875, 3 pages.

Japanese Non-Final Office Action dated Apr. 2, 2013, Japanese Application No. 2011-537661, 2 pages.

Brashear, H. et al., "Using Multiple Sensors for Mobile Sign Language Recognition", International Symposium on Wearable Computers, Oct. 2003, 8 pages.

Consumerreports.Org., "Face Detection, Technology Puts Portraits in Focus", located at <http://www.consumerreports.org/cro/electronics-computers/camera-photograph/cameras-c . . . >, Nov. 2007, last accessed on Feb. 6, 2009, 1 page.

Nintendo Games, "Introducing the Wii MotionPlus, Nintendo's upcoming accessory for the revolutionary Wii remoted at Nintendo:: What's New", located at <http://www.nintendo.com/whatsnew/detail/eMMuRj_N6vntHPDycCJAKWhEO9zBvyPH>, Jul. 14, 2008, last accessed Feb. 6, 2009, 2 pages.

Haro, Antonio et al., "Mobile Camera-Based Adaptive Viewing", 2005, MUM '05 Proceedings of the 4th International Conference on Mobile and Ubiquitous Multimedia.

Nokia N95 8GB Data Sheet, 2007, Nokia.

Cornell, J., "Does This Headline Know You're Reading It?", h+ Magazine, Mar. 19, 2010, lacated at <http://hplusmagazine.com/articles/ai/does-headline-know-you%E2%80%99re-reading-it>, last accessed Jun. 7, 2010, 4 pages.

Padilla, R., "Eye Toy," located at <http://www.archive.gamespy.com/hardware/august03/eyetoyps2/index.shtml>, Aug. 16, 2003, last accessed Feb. 6, 2009, 2 pages.

Schneider, J., "Does Face Detection Technology Really Work? Can the hottest new digital camera feature of 2007 actually improve your people pictures? Here's the surprising answer!" located at <http://www.adorama.com/catalog.tpl?article=052107&op=academy_new>, May 21, 2007, last accessed Feb. 6, 2009, 5 pages.

Tyser, P., "Control an iPod with gestures," located at <http://www.videsignline.com/howto/170702555>, Sep. 11, 2005, last accessed Feb. 6, 2009, 4 pages.

Zyga, L, "PHYSorg.com, Hacking the Wii remote for physics class," located at <http://www.physorg.com/news104502773.html>, Jul. 24, 2007, last accessed Feb. 6, 2009, 2 pages.

Non-Final Office Action dated Jun. 10, 2011; U.S. Appl. No. 12/332,049.

Response to Jun. 10, 2011 Non-Final Office Action filed Aug. 1, 2011; U.S. Appl. No. 12/332,049.

Final Office Action dated Oct. 27, 2011; U.S. Appl. No. 12/332,049.

RCE and Response to Final Office Action dated Oct. 27, 2011 filed Jan. 27, 2012; U.S. Appl. No. 12/332,049.

Non-Final Office Action dated Nov. 7, 2012; U.S. Appl. No. 12/332,049.

Applicant-Initiated Interview Summary dated Jan. 5, 2013; U.S. Appl. No. 12/332,049.

Response to Nov. 7, 2012 Non-Final Office Action filed Feb. 7, 2013; U.S. Appl. No. 12/332,049.

Final Office Action dated Jun. 6, 2013; U.S. Appl. No. 12/332,049.

Applicant-Initiated Interview Summary dated Jul. 30, 2013; U.S. Appl. No. 12/332,049.

Advisory Action dated Aug. 29, 2013; U.S. Appl. No. 12/332,049.

RCE and Response to Advisory Action dated Aug. 29, 3013 filed Sep. 6, 2013; U.S. Appl. No. 12/332,049.

* cited by examiner

SENSOR CONNECTIVITY APPROACHES

CROSS-REFERENCE TO RELATED APPLICATIONS

This application is related, and claims priority, to provisional application 61/708,772, filed Oct. 2, 2012, entitled "Sensor Connectivity Approaches," which is hereby incorporated herein, in its entirety, for all purposes.

BACKGROUND

People are increasingly interacting with computers and other electronic devices in new and interesting ways. One such interaction approach involves making a motion or gesture with respect to a device, which can be detected using a camera or other such element. While image recognition can be used with various cameras on a device to determine various types of motion, users often hold portable computing devices in ways that can block one or more of these cameras, or in orientations where one or more of these cameras are better suited to capture gesture information. While it can be desirable to utilize any camera on the device, the need to capture and analyze information from all these devices, as well as to provide redundant resources to support all these cameras, can take up space in the device and can consume additional resources. This can reduce battery life and increase the size of the device, among other potential disadvantages.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the aforementioned and other deficiencies experienced in conventional approaches to managing and utilizing sensors of a computing device. In particular, various approaches utilize multiple operational modes wherein certain sets or selections of the sensors are activated and able to have sensor data analyzed by one or more processors of the device. In one example, a computing device includes one or more pairs of image sensors, such as cameras or gesture sensors. The image sensors can be configured such that the transmit line of a second image sensor of a pair is connected to the transmit line of a first image sensor of the pair by a digital or electronic switch. Only a single transmit line of the pair is connected to a host processor or other such component. When in a normal operational mode, the switch can be configured to cause data captured by the first image sensor of the pair to be transmitted to a receive input of the host processor. When image data from the second image sensor is to be analyzed, the switch can be adjusted such that the device operates in what is referred to herein as a "bypass mode." In the bypass mode, the transmit line of the second image sensor is connected to the input of the host processor, such that only data from the second image sensor can be received and analyzed by the host processor in that state. By using such a configuration, the number of components, amount of space needed, and/or amount of complexity in the system can be reduced.

Various other applications, processes and uses are presented below with respect to the various embodiments.

Figure 1:
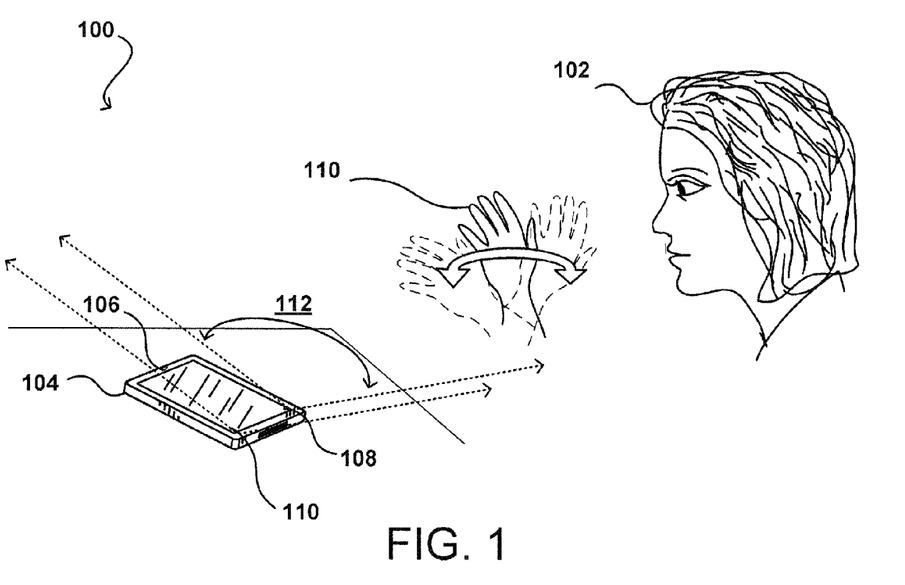
FIG. 1 illustrates an example environment in which various aspects can be implemented in accordance with various embodiments.

FIG. 1 illustrates an example situation 100 wherein specific sensors of a device can be used to detect and provide information for analysis. In this example, a user 102 would like to provide gesture- and/or motion-based input to a computing device 104. Although a portable computing device (e.g., a smart phone, an electronic book reader, or tablet computer) is shown, it should be understood that various other types of electronic device that are capable of determining and processing input can be used in accordance with various embodiments discussed herein. These devices can include, for example, notebook computers, personal data assistants, cellular phones, video gaming consoles or controllers, and portable media players, among others. In this example, the computing device 104 has at least one high resolution camera 106 operable to perform functions such as image and/or video capture for purposes such as self-portrait capture or video chat. The device also includes at least one pair of gesture sensors 108, 110 operable to capture lower resolution images for purposes such as gesture detection. The camera, gesture sensors, and any other such image capture elements on the device may be, for example, a camera, a charge-coupled device (CCD), a motion detection sensor, an ultrasonic sensor, or an infrared sensor, or can utilize another appropriate image-capturing technology.

In this example, the user 102 is performing a selected motion or gesture using the user's hand 110. The motion can be one of a set of motions or gestures recognized by the device to correspond to a particular input or action. If the motion is performed within a viewable area or angular range 112 of the pair of gesture sensors 108, 110 on the device, the sensors can capture one or more images including the motion, such that the device can analyze the images using at least one image analysis or feature recognition algorithm and determine movement of a feature of the user between subsequent frames. This can be performed using any process known or used for determining motion, such as locating "unique" features in one or more initial images and then tracking the locations of those features in subsequent images, whereby the movement of those features can be compared against a set of movements corresponding to the set of motions or gestures, etc. Other approaches for determining motion- or gesture-based input can be found, for example, in co-pending U.S. patent application Ser. No. 12/332,049, filed Dec. 10, 2008, and entitled "Movement Recognition and Input Mechanism," which is hereby incorporated herein by reference. If a motion or gesture is detected that matches a known motion or gesture, a determination can be made of a corresponding input to provide to software executing on the computing device. This can include, for example, sending an input to a user interface application executing on the device, whereby a user can provide input to the user interface application by performing one or more gestures within a field of view of one or more gesture cameras or other such elements.

Approaches in accordance with various embodiments can take advantage of various aspects of CMOS camera technology, or other such imaging technology, to provide a relatively low power but highly accurate gesture sensor that can utilize existing design and implementation aspects to provide a sensible solution to gesture detection. Such a gesture sensor can be used in addition to a conventional camera, in at least some embodiments, which can enable a user to activate or control aspects of the computing device through gesture or movement input, without utilizing a significant amount of resources on the device. A single gesture sensor can be used for basic gestures, or two or more sensors can be used for complex and/or three-dimensional gestures, among other such options.

Figure 2:
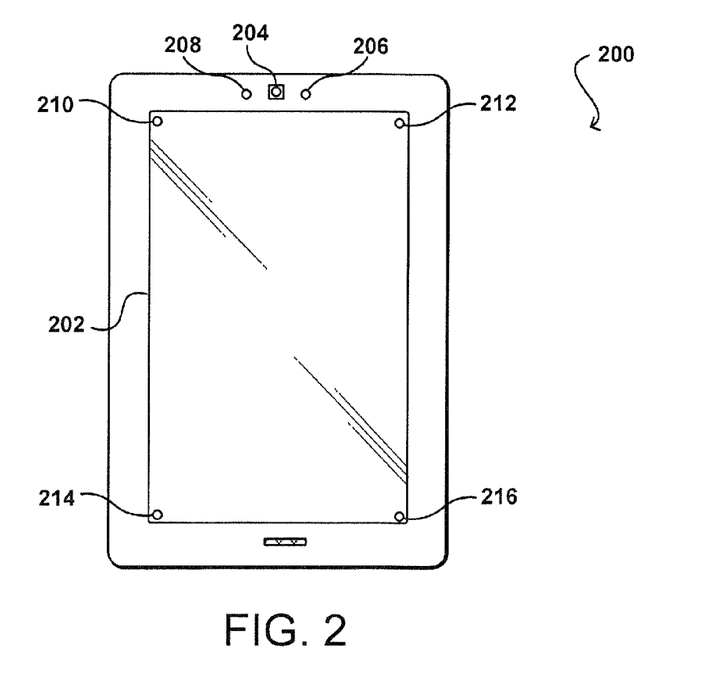
FIG. 2 illustrates an example computing device that can be used in accordance with various embodiments.

FIG. 2 illustrates an example computing device 200 that can be used in accordance with various embodiments. In this example, the device has a conventional digital camera 204 on the same side of the device as a display element 202, enabling the device to capture image information about a user of the device during typical operation where the user is at least partially in front of the display element. In addition, there are four gesture sensors 210, 212, 214, 216 positioned on the same side of the device that can be used to determine gesture input from the user when at relatively the same location. It should be understood that there can be additional cameras, gesture sensors, or other such elements on the same or other sides or locations of the device as well within the scope of the various embodiments, such as may enable gesture or image input from any desired direction or location with respect to the device. Two image sensors, such as two gesture sensors or a gesture sensor and a camera, among other sensors of different types (e.g., different color depth (number of bits used to indicate the color of a single pixel in a bitmapped image or video frame buffer), monochrome, infrared, higher resolution, etc.) can be used together advantageously in various situations, such as where a device wants to enable gesture recognition at relatively low power over an extended period of time using the gesture sensor(s), and perform facial recognition or other processor and power intensive processes at specific times using the conventional, higher resolution camera.

This example device also illustrates additional elements that can be used as discussed later herein, including a light sensor 206 for determining an amount of light in a general direction of an image to be captured and an illumination element 208, such as a white light emitting diode (LED) or infrared (IR) emitter as will be discussed later herein, for providing illumination in a particular range of directions when, for example, there is insufficient ambient light determined by the light sensor. Various other elements and combinations of elements can be used as well within the scope of the various embodiments as should be apparent in light of the teachings and suggestions contained herein.

In many embodiments, image data captured by two of the gesture sensors will be sufficient to determine a motion or gesture, performed by a user, in two or three dimensions. Thus, it can be advantageous to only operate a selected subset of the gesture sensors in FIG. 2, in order to save power and reduce the processing and memory capacity needed to support all four gesture sensors operating concurrently. Further, as discussed above, in certain orientations it can be more likely that certain gesture sensors might be in better position to view a user, or it might be more likely that one or more of the sensors might be blocked by one or more hands of the user. If only a subset of the gesture sensors will be active at any time, it then can be desirable to reduce the number of components associated with the sensors that would otherwise be needed to store, route, and/or analyze the additional data.

When performing tasks such as detecting gestures in three dimensions using two gesture sensors, each sensor will need to be connected to a processing component such as a host processor or application processor. In certain conventional approaches, each sensor can have a receive line and a transmit line, or other transmission mechanism, that connects to the processing component. For image sensors, each sensor can have a MIPI transmitter and a MIPI receiver, among other such options. If there are multiple pairs of sensors on the device, and only one of each pair of sensors will be transferring data to the processing component at any given time, however, at least some of this redundancy can be advantageously removed by providing only a single connection from each pair of sensors to the processing component.

Figure 3A:
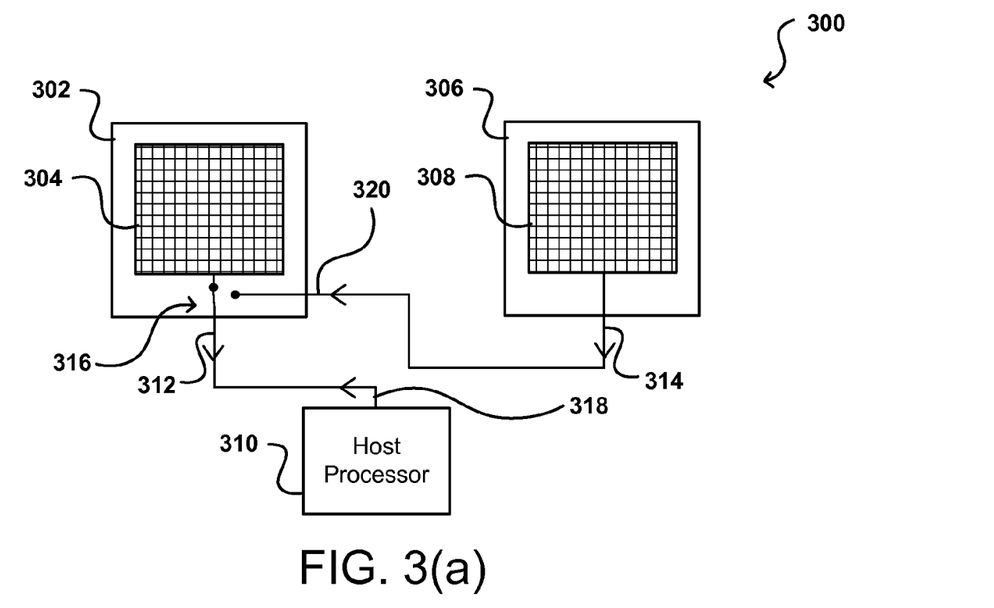
FIGS. 3(a) and 3(b) illustrate normal and bypass operational configurations for a pair of sensors that can be used in accordance with various embodiments.

For example, consider the example configuration 300 of FIG. 3(a). In this example, a pair of image sensors 302, 306 (or other such sensors) each contains an active region 304, 308 (respectively) for capturing light, and the sensors can each provide a signal including data representative of the captured light. In conventional approaches, each of these sensors 302, 306 would have a MIPI transmitter directed to a MIPI receiver of the associated host processor 310. In this example, however, the MIPI transmit line 314 from one of the image sensors 306 is connected to the other sensor 302 using a MIPI receive line 320 or other input to the sensor 302. In at least some embodiments, a connection between sensors can be accomplished using a multiplexer (MUX). The MUX can be a dedicated ASIC that combines the incoming data or a high speed analog MUX. In this embodiment, an electronic switch 316 is positioned at the location of the connection, and can alternatively connect the MIPI transmit of either of the sensors to the MIPI receive line 318 of the host processor 310. The switch can be placed at, or near, the last stage in the MIPI pipeline. The configuration illustrated in FIG. 3(a) will be referred to herein as a "normal" mode, as the switch connects the MIPI transmit 312 of the first image sensor 302 to the host processor 310, whereby data captured by the first sensor can be streamed, or otherwise transmitted, to the host processor.

Figure 3B:
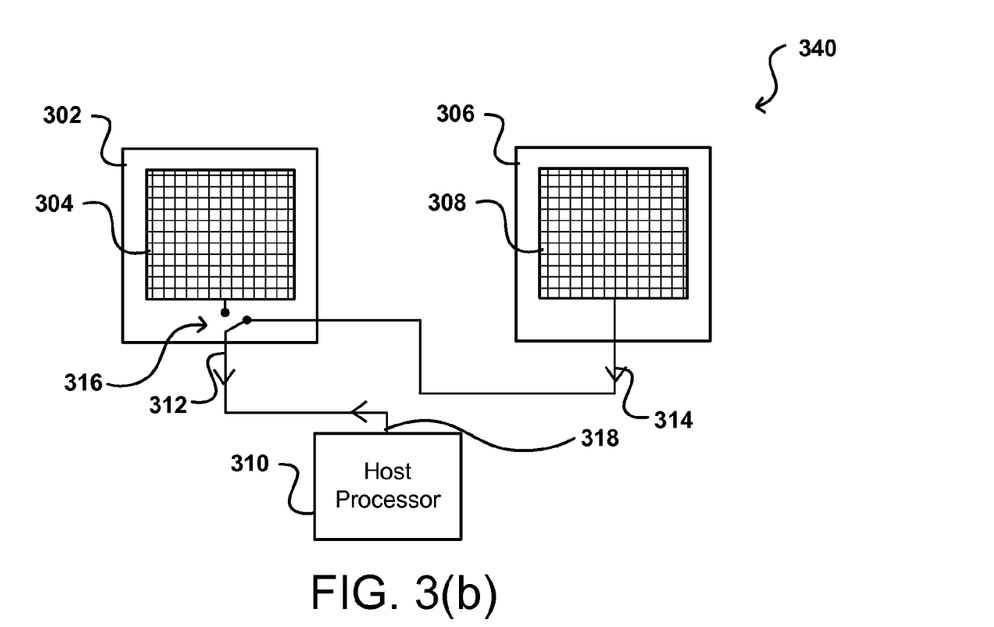

FIG. 3(b) illustrates the same components, but in this example the switch 316 is in a bypass setting for the configuration 340, wherein the MIPI transmit line 314 of the second image sensor 306 is connected to the receive line 318 of the host processor. This mode is referred to herein as "bypass" mode. In bypass mode, only the data from the second sensor 306 can be streamed, or otherwise transmitted, to the host processor 310. By changing the "position" of the switch 316, the device can alternatively operate in normal or bypass mode, allowing data from one or the other of the sensors to be received to the host processor over the MIPI receive line 318.

Such an approach can enable a daisy-chain or master-slave style control scheme. An application processor or other component can cause the switch to alternate between normal and bypass settings, and can contact each image sensor as appropriate to indicate the mode to be utilized. In some embodiments, each image sensor might instead determine the mode by the state of the switch. Other approaches can be utilized as well within the scope of the various embodiments. Since data from only one of the sensors will be passing into the MIPI receiver of the host processor, there can be no need for data muxing in at least some embodiments.

The bypass mode on a first sensor can be viewed as an extension of the differential MIPI lines for the second sensor. This architecture can be extended to connect multiple cameras or sensors, as any number of sensors can be alternately connected via such a switch in various embodiments. At any point in time only a single connected sensor of such a set will be transmitting data to the connected processor, regardless of the number of connected sensors. In some embodiments two or more sensors might be concurrently capturing data. Sensors not transferring data can store the data until the sensor currently connected to the processor by the switch is done transmitting, or the switch is otherwise adjusted to connect a different sensor. In at least some embodiments one or more sensors not transferring data can be performing any of a number of different tasks, which might be related or unrelated to image capture. Thus, any sensor not currently connected by the switch can be programmed to perform any appropriate task or be in any desired mode. Such an approach can be beneficial for applications such as global shutter cameras, which have a provision to store image data in the active area by design and will not need any extra storage. Such an implementation, however, is not limited to global shutter sensors and can be extended to rolling shutter imagers and other such sensor implementations. In some embodiments, data might be able to be muxed on the sensor associated with the switch in order to eliminate a MIPI receiver. If that sensor has sufficient memory, the data from the second sensor can be saved as the first sensor captures data, and while data is being captured for the first sensor data from the second sensor can be muxed and/or transmitted.

In some embodiments, a sensor not currently connected can begin streaming data before or after switching modes, and the other sensor can stop streaming data before or after switching modes. In at least some embodiments there can be separate inputs (e.g., I²C lines) for controlling data streaming and other such aspects for each sensor.

An advantage to using low resolution gesture sensors is that the amount of image data that must be transferred is significantly less than for conventional cameras. Accordingly, a lower bandwidth bus can be used for the gesture sensors in at least some embodiments than is used for conventional cameras. For example, a conventional camera typically uses a bus such as a CIS (CMOS Image Sensor) or MIPI (Mobile Industry Processor Interface) bus to transfer pixel data from the camera to the host computer, application processor, central processing unit, etc. A low power, low resolution gesture sensor, on the other hand, can have a number of pixels on the order of about 1024 pixels, or in the range of about 256 to 76,000 pixels. Further, the gesture sensor can have frame rates for gesture interpretation on the order of about 60 frames per second, with ranges from about 15 frames per second to about 240 frames per second in various embodiments.

In some embodiments the gesture sensors can be synchronized in order to enable tracking of objects between fields of view of the gesture sensors. In one embodiment, synchronization commands can be sent over the I²C bus, or a dedicated line can be used to join the two sensors, in order to ensure synchronization.

In a situation such as that illustrated in FIG. 2 where there are four gesture sensors, and only two of them will be operating at any time, the four gesture sensors can be logically split into two pairs, wherein each pair can operate in normal or bypass mode such that only one sensor of each pair would stream data at any time. In at least some embodiments, one pair can operate in normal mode while the other pair operates in bypass mode, in order to provide additional imaging options.

Figure 4:
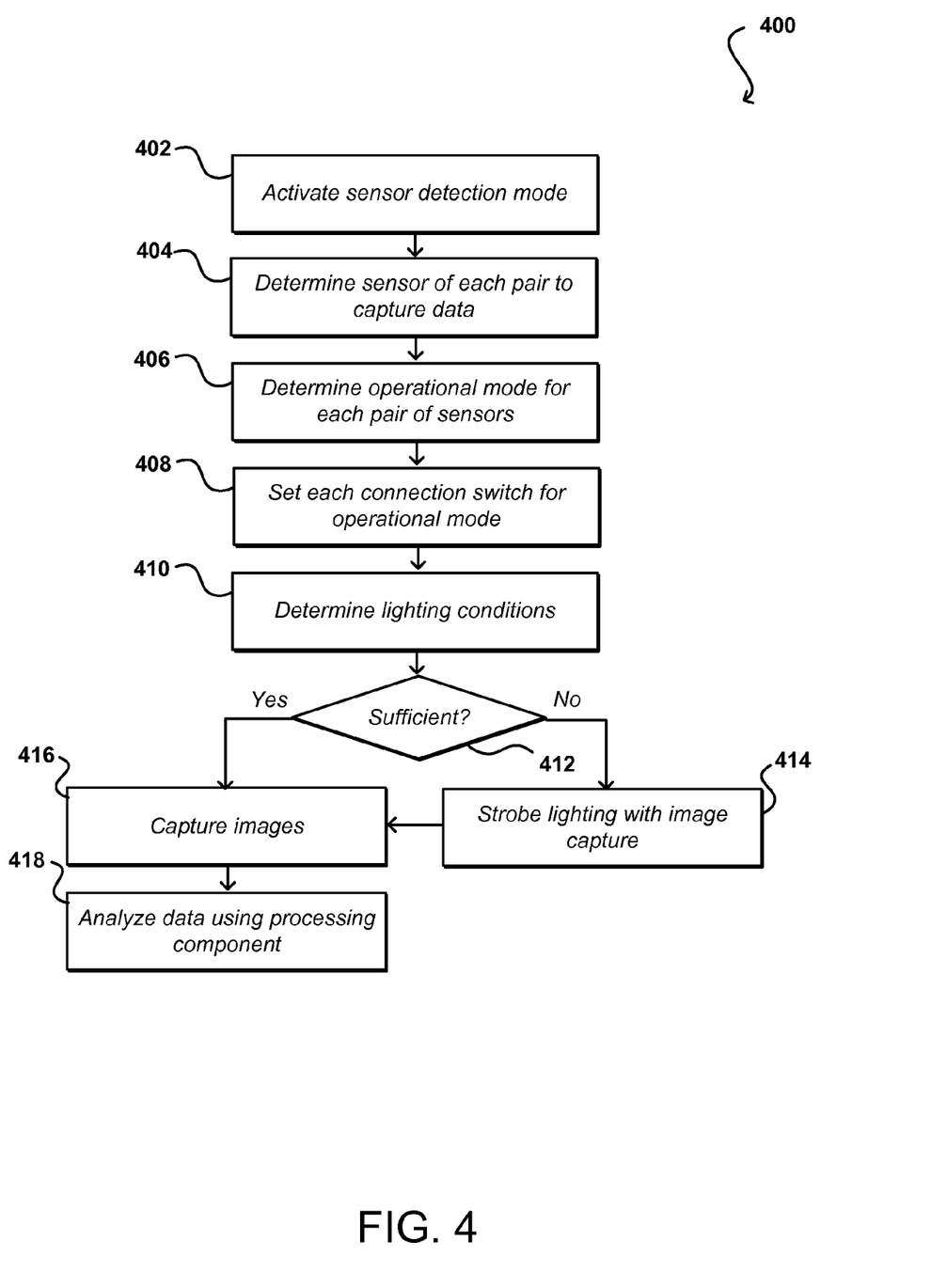
FIG. 4 illustrates an example process for using sensors for functions such as gesture input that can be used in accordance with various embodiments.

FIG. 4 illustrates an example process 400 for enabling sensor input for a computing device that can be used in accordance with various embodiments. It should be understood that, for any process discussed herein, there can be additional, fewer, or alternative steps performed in similar or alternative orders, or in parallel, within the scope of the various embodiments unless otherwise stated. In this example, sensor detection is activated 402 on the computing device. Selecting and using various sensors or imagers can be used with a number of different applications or purposes within the scope of the various embodiments, such as may include gesture detection, computer vision analysis, object recognition, object tracking, stereo imaging, three-dimensional imaging, depth sensing, augmented reality, and the like. In some embodiments, gesture detection (or other such functionality) can automatically be activated whenever the computing device is active, even in a sleep mode or other such low power state. In other embodiments, the gesture detection mode is activated automatically upon running an application or manually upon user selection. Various other activation events can be utilized as well. The device can determine 404 the sensor of each pair to use for image capture, as may be based upon device orientation, relative user location, application, or other such information. As discussed, if there are more than two pairs of sensors on the device the device can also select which pairs to use for the gesture detection. The device (or a component in communication with the device) can also determine 406 the operational mode for each pair of sensors. As discussed, either of a pair of sensors can be used for image capture or gesture detection, for example, with the selection of the sensor causing that pair of sensors to operate in a normal or bypass mode. The connection switch (or other such mechanism) for each pair of sensors then can be set 408 for the determined operational mode, which can involve leaving the switch in its current state or adjusting the switch to transfer data from a different sensor to the respective processor.

In at least some embodiments, the device will attempt to determine 410 an amount of ambient lighting, such as by using at least one light sensor or analyzing the intensity of the light information captured by the gesture sensors. The selection of sensors can affect the determination of necessary lighting in at least some embodiments. If the amount of ambient light (or light from an LCD screen, etc.) is determined 412 to be insufficient, or additional illumination is otherwise desired, at least one illumination element (e.g., an LED) can be triggered to strobe 414 at times and with periods that substantially correspond with the capture times and windows of the gesture sensors. The commands to the illumination element in at least some embodiments are sent over an I²C bus. If an illumination element is triggered or the ambient light is determined to be sufficient, one or more images can be captured 416 using the selected gesture sensors. The image data from each sensor can be transferred over the connection and analyzed 418 by the respective processor. If a function such as gesture detection is active, a determination can be made as to whether any detected motion corresponds to a recognizable gesture. If not, the device can continue to capture images and monitor for gestures. If the motion does correspond to a gesture, an action or input corresponding to that gesture can be determined and an action performed accordingly. Various other approaches can be used as well as discussed or suggested elsewhere herein.

Figure 5:
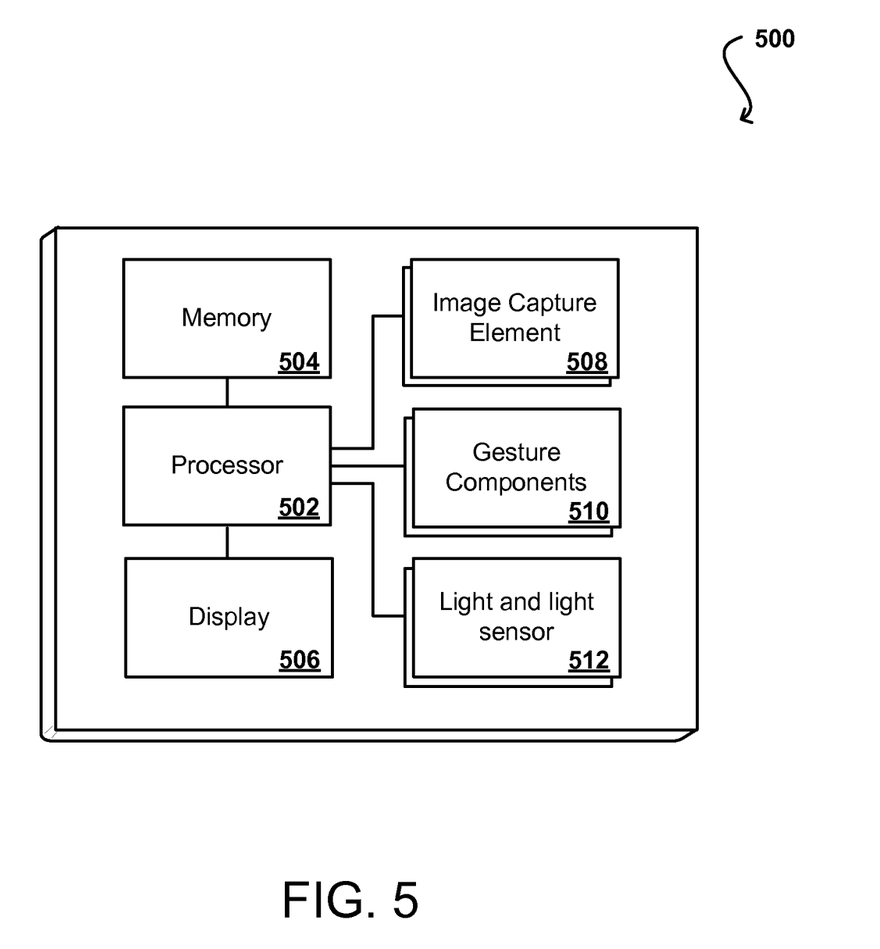
FIG. 5 illustrates an example configuration of components of a computing device that can be used in accordance with various embodiments.

In order to provide various functionality described herein, FIG. 5 illustrates an example set of basic components of a computing device 500, such as the device 104 described with respect to FIG. 1. In this example, the device includes at least one central processor 502 for executing instructions that can be stored in at least one memory device or element 504. As would be apparent to one of ordinary skill in the art, the device can include many types of memory, data storage or computer-readable storage media, such as a first data storage for program instructions for execution by the processor 502, the same or separate storage can be used for images or data, a removable storage memory can be available for sharing information with other devices, etc. The device typically will include some type of display element 506, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include multiple image capture elements 508, such as one or more high resolution cameras that are able to image a user, people, or objects in the vicinity of the device. The device can also include at least one separate gesture sensor 510 operable to capture image information for use in determining gestures or motions of the user, which will enable the user to provide input through the portable device without having to actually contact and/or move the portable device. An image capture element can include, or be based at least in part upon any appropriate technology, such as a CCD or CMOS image capture element having a determine resolution, focal range, viewable area, and capture rate. As discussed, various functions can be included on with the gesture sensor or camera device, or on a separate circuit or device, etc. A gesture sensor can have the same or a similar form factor as at least one camera on the device, but with different aspects such as a different resolution, pixel size, and/or capture rate. While the example computing device in FIG. 1 includes one image capture element and two gesture sensors on the "front" of the device, it should be understood that such elements could also, or alternatively, be placed on the sides, back, or corners of the device, and that there can be any appropriate number of capture elements of similar or different types for any number of purposes in the various embodiments. The device also can include at least one lighting element 512, as may include one or more illumination elements (e.g., LEDs or flashlamps) for providing illumination and/or one or more light sensors for detecting ambient light or intensity.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Various embodiments also can control the shutter speed for various conditions. In some embodiments, a gesture sensor might have only one effective "shutter" speed, such as may be on the order of about one millisecond in order to effectively freeze the motion in the frame. In at least some embodiments, however, the device might be able to throttle or otherwise adjust the shutter speed, such as to provide a range of exposures under various ambient light conditions. In one example, the effective shutter speed might be adjusted to 0.1 milliseconds in bright daylight to enable to the sensor to capture a quality image. As the amount of light decreases, such as when the device is taken inside, the shutter might be adjusted to around a millisecond or more. There might be a limit on the shutter speed to prevent defects in the images, such as blur due to prolonged exposure. If the shutter cannot be further extended, illumination or other approaches can be used as appropriate. In some embodiments, an auto-exposure loop can run local to the camera chip, and can adjust the shutter speed and/or trigger an LED or other such element as necessary. In cases where an LED, flashlamp, or other such element is fired to separate the foreground from the background, the shutter speed can be reduced accordingly. If there are multiple LEDs, such as one for a camera and one for a gesture sensor, each can be triggered separately as appropriate.

Figure 6:
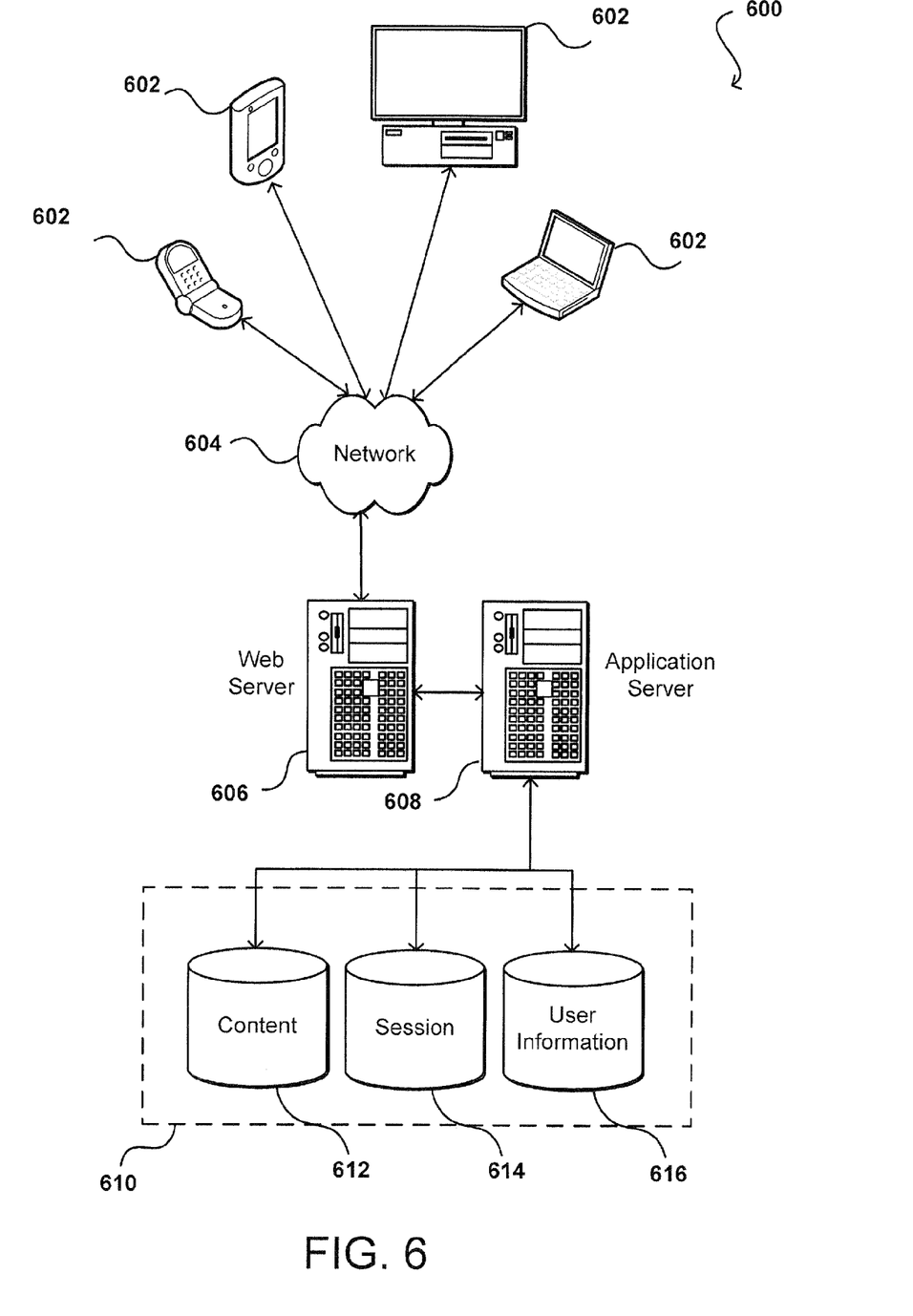
FIG. 6 illustrates an example environment in which various embodiments can be implemented.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks, an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 608 can include any appropriate hardware and software for integrating with the data store 610 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 606 in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing content (e.g., production data) 612 and user information 616, which can be used to serve content for the production side. The data store is also shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the environment 600 in FIG. 6 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   at least one processor;
   a first pair of image sensors, the first pair of image sensors having a single transmit path to the at least one processor selectively connected to one of the first pair of image sensors using a first switch that selectively connects one of the first pair of image sensors to the processor;
   a second pair of image sensors, the second pair of image sensors having a single transmit path to the at least one processor selectively connected to one of the second pair of image sensors using a second switch that selectively connects one of the second pair of image sensors to the processor;
   and memory including instructions that, when executed by the at least one processor, cause the computing device to:
      determine, based at least in part on a distance of the computing device to a user location, a first sensor of the first pair of image sensors and a second sensor of the second pair of image sensors from which to transfer data;
      cause the first switch to connect the first sensor to the at least one processor;
      cause the second switch to connect the second sensor to the at least one processor;
      determine that an intensity value of ambient light in a first area within a field of view of the first sensor or a second area within a field of view of the second sensor is less than a threshold intensity value to detect at least one gesture;
      cause an illumination device associated with the first sensor to be activated;
      capture first image data using the first sensor while the illumination device is activated, and second image data using the second sensor; and
      analyze the first image data and the second image data using the at least one processor to detect the at least one gesture performed within the first area or the second area.

2. The computing device of claim 1, further comprising:
   an orientation sensor configured to determine an orientation of the computing device, the determining of the first sensor and the second sensor being based at least in part upon orientation data from the orientation sensor.

3. The computing device of claim 1, wherein the instructions when executed, further cause the at least one processor to:
   perform, using the first image data and the second image data, at least one of stereo imaging, three-dimensional imaging, depth sensing, augmented reality, computer vision analysis, object identification, or object tracking.

4. A computing device, comprising:
   a device processor;
   a first pair of image sensors;
   a second pair of image sensors;
   a switch configured to selectively connect one of the first pair of image sensors or one of the second pair of image sensors to the device processor; and
   memory including instructions that, when executed by the at least one processor, cause the computing device to:
      determine, based at least in part on a distance of the computing device to a user location, a selected sensor to obtain image data, the selected sensor being one of a first sensor of the first pair of image sensors or a second sensor of the second pair of image sensors;
      set the switch to selectively connect the selected sensor to the device processor;
      determine that an intensity value of ambient light in a first area within a field of view of the selected sensor is less than a threshold intensity value to detect at least one gesture;
      cause an illumination device associated with the selected sensor to be activated;
      cause image data captured by the selected sensor while the illumination device is activated to be transmitted to the device processor for analysis; and
      analyze the image data to detect at least one gesture.

5. The computing device of claim 4, further comprising:
   at least a third image sensor, the switch being further configured to selectively connect one of the first pair of image sensors, or one of the second pair of image sensors, or the at least one third image sensor to the device processor.

6. The computing device of claim 4, wherein the second sensor of the second pair of image sensors is configured to concurrently capture image data while the first sensor of the first pair of image sensors is the selected sensor, the second sensor of the second pair of image sensors configured to store the image data until the switch is adjusted to enable transferring of the image data from the second sensor of the second pair of image sensors to the device processor.

7. The computing device of claim 4, wherein a transmit line of the first pair of image sensors is connected to a transmit line of the second pair of image sensors by the switch.

8. The computing device of claim 4, wherein the first pair of image sensors are a different type of image sensors than the second pair of image sensors.

9. The computing device of claim 8, wherein the one of the first pair of image sensors is one of an infrared sensor, a monochrome sensor, or a full color image sensor.

10. The computing device of claim 8, wherein the first pair of image sensors have a higher resolution than the second pair of image sensors.

11. The computing device of claim 4, wherein the switch is configured to alternate between operating in a normal mode and a bypass mode, wherein the switch connects the one of the first pair of image sensors to the device processor in the normal mode and wherein the switch connects the one of the second pair of image sensors to the device processor in the bypass mode.

12. The computing device of claim 11, wherein the one of the first pair of image sensors and the one of the second pair of image sensors are configured to determine whether the switch is in the normal mode or the bypass mode by determining a state of the switch or receiving a state communication.

13. The computing device of claim 11, wherein the one of the second pair of image sensors is configured to operate in one of a plurality of operational modes while the one of the first pair of image sensors is connected to the device processor, the operational modes including at least one of an image capture mode or a standby mode.

14. The computing device of claim 4, wherein the memory further includes instructions for operating the one of the first pair of image sensors, the one of the second pair of image sensors, and any additional image sensors in a group of image sensors according to at least one of a daisy-chain control scheme or a master-slave control scheme.

15. The computing device of claim 4, wherein the one of the first pair of image sensors and the one of the second pair of image sensors have at least one of different sizes, different color depths, or different resolutions.

16. The computing device of claim 4, wherein the device processor is configured to analyze the image data to perform at least one of stereo imaging, three-dimensional imaging, depth sensing, augmented reality, gesture detection, computer vision analysis, object identification, or object tracking.

17. A computer-implemented method, comprising:
    determining, based at least in part on a distance of a computing device to a user location, a selected sensor from a set of image sensors, to obtain image data, the set of image sensors including a first pair of image sensors and a second pair of image sensors;
    setting a switch for the set of image sensors to selectively connect a transmit line of the selected sensor to a device processor;
    determining that an intensity value of ambient light in a first area within a field of view of the selected sensor is less than a threshold intensity value to detect at least one gesture;
    causing an illumination device associated with the selected sensor to be activated;
    capturing, while the illumination device is activated, image data using the selected sensor; and
    analyzing the image data to detect at least one gesture,
    wherein the selected sensor of the set of image sensors is configured to transfer the image data to the device processor when the switch connects the selected sensor to the device processor.

18. The computer-implemented method of claim 17, further comprising:
    causing a second image sensor of the set of image sensors to store any captured image data while the switch connects the selected sensor to the device processor.

19. The computer-implemented method of claim 18, further comprising:
    analyzing the image data to perform at least one of computer vision analysis, object identification, or object tracking.

* * * * *